US010932176B1

(12) United States Patent
Butler

(10) Patent No.: US 10,932,176 B1
(45) Date of Patent: Feb. 23, 2021

(54) WIRELESS ACCESS NODE FAULT RECOVERY USING INTEGRATED ACCESS AND BACKHAUL

(71) Applicant: Sprint Communications Company L.P., Overland Park, KS (US)

(72) Inventor: Robert Keith Butler, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 16/716,975

(22) Filed: Dec. 17, 2019

(51) Int. Cl.
| H04W 40/00 | (2009.01) |
| H04W 36/30 | (2009.01) |
| H04W 36/00 | (2009.01) |
| H04W 24/04 | (2009.01) |
| H04W 8/30 | (2009.01) |
| H04W 36/06 | (2009.01) |

(52) U.S. Cl.
CPC .......... *H04W 36/305* (2018.08); *H04W 8/30* (2013.01); *H04W 24/04* (2013.01); *H04W 36/0022* (2013.01); *H04W 36/0033* (2013.01); *H04W 36/06* (2013.01)

(58) Field of Classification Search
USPC ................................................ 455/436, 445
See application file for complete search history.

(56) References Cited

U.S. PATENT DOCUMENTS

| 7,072,296 | B2 | 7/2006 | Turner et al. |
| 8,170,544 | B1 | 5/2012 | Satapathy et al. |
| 9,819,595 | B2 | 11/2017 | Cioffi et al. |
| 10,206,232 | B2 | 2/2019 | Novlan et al. |
| 2009/0029645 | A1 | 1/2009 | Leroudier |
| 2016/0345192 | A1 | 11/2016 | Garg et al. |
| 2017/0012668 | A1* | 1/2017 | Fang ................. H02J 1/00 |
| 2018/0077006 | A1* | 3/2018 | Cui ................... H04L 41/0816 |
| 2019/0281478 | A1* | 9/2019 | Fu ..................... H04B 1/0007 |
| 2019/0349834 | A1 | 11/2019 | Teyeb et al. |
| 2019/0350023 | A1 | 11/2019 | Novlan et al. |
| 2020/0146109 | A1* | 5/2020 | Majmundar ........ H04W 76/11 |
| 2020/0154336 | A1* | 5/2020 | Islam ................. H04W 40/12 |

FOREIGN PATENT DOCUMENTS

| WO | 2019139524 A1 | 7/2019 |
| WO | 2019157948 A1 | 8/2019 |
| WO | 2019192329 A1 | 10/2019 |
| WO | 2019216696 A1 | 11/2019 |
| WO | WO-2020102308 A1 * | 5/2020 ........... H04W 72/04 |
| WO | WO-2020122247 A1 * | 6/2020 ........... H04W 48/10 |

* cited by examiner

Primary Examiner — David Q Nguyen

(57) ABSTRACT

In a wireless access node, a baseband unit (BBU) detects a fault and responsively directs an Integrated Access and Backhaul (IAB) Mobile Terminal (MT) to scan for a wireless IAB service. The IAB MT scans for the wireless IAB service and establishes a wireless IAB link. The BBU exchanges fault data with the IAB MT. The IAB MT wirelessly exchanges the fault data with a neighbor access node over the wireless IAB link. The BBU recovers from the fault in response to the fault data.

20 Claims, 9 Drawing Sheets

WIRELESS ACCESS NODE FAULT RECOVERY USING INTEGRATED ACCESS AND BACKHAUL

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless communication networks have wireless access nodes that exchange wireless signals with the wireless user devices using wireless network protocols. Exemplary wireless network protocols include Institute of Electrical and Electronic Engineers (IEEE) 802.11 (WIFI), Long Term Evolution (LTE), Fifth Generation New Radio (5GNR), and Low-Power Wide Area Network (LP-WAN).

The wireless access nodes are coupled to the wireless communication networks over backhaul links. The backhaul links use data communication protocols like Time Division Multiplex (TDM), IEEE 802.3 (ethernet), Internet Protocol (IP), and the like. The backhaul links typically use physical media like metal or glass. To extend the range of their wireless data services, the wireless communication networks are deploying wireless backhaul links. The wireless backhaul links use wireless network protocols like WIFI, LTE, and 5GNR. The Third Generation Partnership Project (3GPP) Technical Report (TR) 38.874 describes wireless Integrated Access and Backhaul (IAB) for wireless communication networks. 3GPP TR 38.874 specifies the IAB Mobile Terminal (MT) that provides wireless connectivity to a wireless access node over a wireless backhaul link. The IAB MT may be configured and operate like a wireless user device, but the IAB MT serves a wireless access node and not an end-user.

Unfortunately, wireless access nodes experience network faults that degrade or terminate their wireless data services. For example, an IP router or ethernet switch in a wireless access node may crash and become non-responsive. IAB describes techniques to discover and use alternative wireless backhaul links to bypass these faults. Technicians and troubleshooting systems are then used to fix the bypassed fault. IAB and the IAB Mobile Terminal (MTs) have not been efficiently and effectively used by wireless access nodes and wireless communication networks to fix these types of network faults.

TECHNICAL OVERVIEW

In a wireless access node, a baseband unit (BBU) detects a fault and responsively directs an Integrated Access and Backhaul (IAB) Mobile Terminal (MT) to scan for a wireless IAB service. The IAB MT scans for the wireless IAB service and establishes a wireless IAB link. The BBU exchanges fault data with the IAB MT. The IAB MT wirelessly exchanges the fault data with a neighbor access node over the wireless IAB link. The BBU recovers from the fault in response to the fault data.

DETAILED DESCRIPTION

Figure 1:
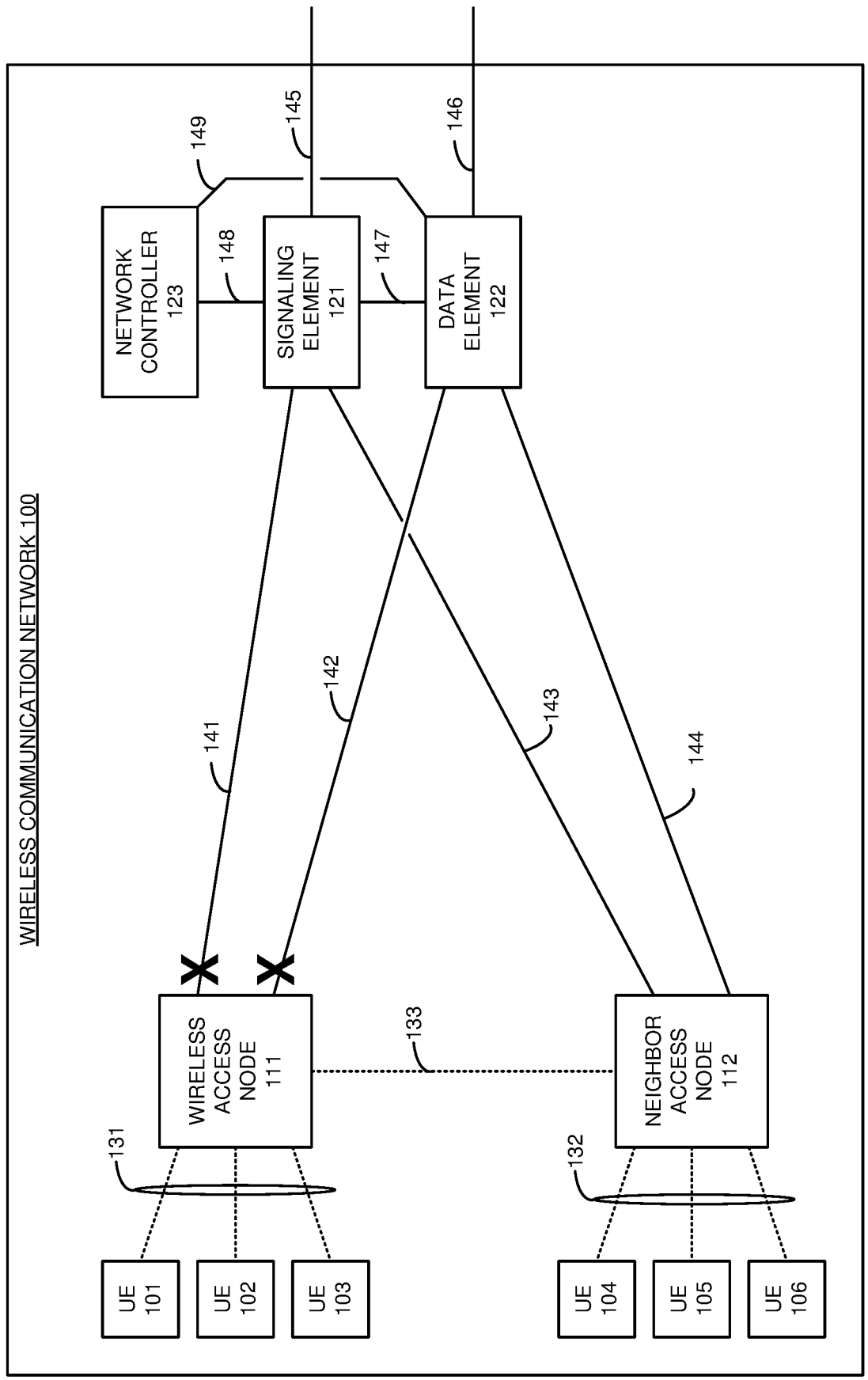
FIG. 1 illustrates a wireless communication network that uses Integrated Access and Backhaul (IAB) to recover from wireless access node faults.

FIG. 1 illustrates wireless communication network 100 that uses Integrated Access and Backhaul (IAB) to recover from wireless access node faults. Wireless communication network 100 comprises User Equipment (UEs) 101-106, wireless access node 111, neighbor access node 112, signaling element 121, data element 122, and network controller 123. Wireless communication network 100 serves UE 103-106 with wireless data services like internet-access, messaging, conferencing, machine control, or some other wireless networking product. UEs 101-103 might be phones, computers, robots, vehicles, or some other data appliances with wireless communication circuitry.

UEs 101-103 and wireless access node 111 are coupled over wireless links 131. UEs 104-106 and neighbor access node 112 are coupled over wireless links 132. To recover from faults, wireless access node 111 and neighbor access node 112 are coupled over wireless IAB link 133. Links 131-133 use Fifth Generation New Radio (5GNR), Long Term Evolution (LTE), IEEE 802.11 (WIFI), Low-Power Wide Area Network (LP-WAN), or some other wireless communication protocol. Links 131-133 use electromagnetic frequencies in the low-band, mid-band, high-band, or some other part of the electromagnetic spectrum.

Wireless access node 111 and signaling element 121 are coupled over backhaul link 141. Wireless access node 111 and data element 122 are coupled over backhaul link 142. Neighbor access node 112 and signaling element 121 are coupled over backhaul link 143. Neighbor access node 112 and data element 122 are coupled over backhaul link 144. Signaling element 121 is coupled to external systems over data link 145. Data element 122 is coupled to external systems over data link 146. Signaling element 121 and data element 122 are coupled over network link 147. Signaling element 121 and network controller 123 are coupled over network link 148. Data element 122 and network controller 123 are coupled over network link 149. Links 141-144 use Institute of Electrical and Electronic Engineers (IEEE) 802.3 (Ethernet), Time Division Multiplex (TDM), Data Over Cable System Interface Specification (DOCSIS), Internet Protocol (IP), 5GNR, WIFI, LTE, LP-WAN, or some other data communication protocol. Links 145-146 use TDM, Ethernet, IP, 5GNR or some other data communication protocol. Links 147-149 use TDM, Ethernet, IP, 5GNR, virtual switching, inter-processor communications, or some other data communication protocol.

Access nodes 111-112 comprise radio circuitry and Baseband Unit (BBU) circuitry. The radio circuitry comprises antennas, filters, amplifiers, analog-to-digital interfaces, microprocessors, memory, software, transceivers, bus circuitry, and the like. The BBU circuitry comprises microprocessors, memory, software, transceivers, and bus circuitry, and the like. The microprocessors comprise Digital Signal Processors (DSP), Central Processing Units (CPUs), Graphical Processing Units (GPUs), Application-Specific Integrated Circuits (ASICs), and/or the like. The memories comprise Random Access Memory (RAM), flash circuitry, disk drives, and/or the like. The memories store software like operating systems and network applications.

Signaling element 121, data element 122, and network controller 123 comprise processing circuitry like microprocessors, memory, software, transceivers, and bus circuitry. The microprocessors comprise CPU, GPUs, ASICs, and/or the like. The memories comprise RAM, flash circuitry, disk drives, and/or the like. The memories store software like operating systems, virtual layers, and network applications. Signaling element 121 comprises an Access and Mobility Management Function (AMF), Session Management Function (SMF), Mobility Management Entity (MME), Software-Defined Network (SDN) controller, or some other control-plane processor. Data element 122 comprises a User Plane Function (UPF), Serving Gateway (SGW), Packet Data Network Gateway (PGW), SDN packet processor, or some other data-plane machine. Network controller 123 comprises a Technical Assistance Center (TAC), Fault Management System (FMS), or some other fault recovery computer system.

The BBU circuitry in wireless access node 111 exchanges network signaling with signaling element 121 over backhaul link 141. Signaling element 121 exchanges network signaling with data element 122 over network link 147. In response to the network signaling. The radio circuitry in wireless access node 111 wirelessly exchanges user data with UEs 101-103 over links 131. The radio circuitry and the BBU circuitry in wireless access node 111 exchange the user data. The BBU circuitry in wireless access node 111 exchanges the user data with data element 122 over backhaul link 142. Data element 122 exchanges the user data with other systems over data link 146.

Neighbor access node 112 exchanges network signaling with signaling element 121 over backhaul link 143. Signaling element 121 exchanges network signaling with data element 122 over network link 147. In response to the network signaling, neighbor access node 112 wirelessly exchanges user data with UEs 104-106 over links 132. Neighbor access node 112 exchanges the user data with data element 122 over backhaul link 144. Data element 122 exchanges the user data with other systems over data link 146.

A fault occurs in wireless access node 111 that inhibits backhaul communications. For example, a cell-site router or ethernet switch in wireless access node 111 may crash. Wireless access node 111 detects the fault, and in response, the radio circuitry scans for wireless IAB service. Typically, the BBU circuitry in wireless access node 111 initially detects the fault by sensing a loss of communications over backhaul links 141-142.

Signaling element 121 and/or data element 122 detect the fault and responsively transfer fault information to network controller 123. Typically, elements 121-122 initially detect the fault by sensing a loss of communications over backhaul links 141-142. Network controller 123 detects the fault in response to the fault information and selects neighbor access node 112 to help with fault recovery. For example, network controller 123 might host a data structure that translates a communication loss with wireless access node 111 into the ID for neighbor node 112. Network controller 123 may process network topology data and access node status to select neighbor access node 112 based on its physical proximity to wireless access node 111 and based on normal operational status for backhaul links 143-144.

Network controller 123 transfers network signaling to neighbor access node 112 to initiate wireless IAB service over elements 121-122 and backhaul links 143-144. In response to the signaling, neighbor access node 112 wirelessly transmits an IAB broadcast to identify its IAB service. The radio circuitry in wireless access node 111 is scanning for and receives the IAB broadcast. In response to receiving the IAB broadcast, the radio circuitry in wireless access node 111 exchanges IAB attachment signaling with neighbor access node 112 to establish wireless IAB link 133.

Wireless access node 111 and/or neighbor access node 112 report IAB link 133 to network controller 123 over elements 121-122 and backhaul links 143-144. Network controller 123 and the BBU circuitry in wireless access node 111 exchange fault data to perform fault recovery. The exchange of the fault data occurs over wireless IAB link 133, neighbor access node 112, backhaul link 143 or 144, element 121 or 122, and network link 148 or 149.

Wireless access node 111 recovers from the fault in response to the fault data. For example, the BBU circuitry in wireless access node 111 may reboot a hardware component and/or a software component responsive to the signaling. The hardware/software components may reside in cell-site routers, ethernet switches, or some other access node circuitry.

After the fault recovery, the BBU circuitry in wireless access node 111 exchanges network signaling with signaling element 121 over backhaul link 141. Signaling element 121 exchanges network signaling with data element 122 over network link 147. In response to the network signaling, the radio circuitry in wireless access node 111 wirelessly exchanges user data with UEs 101-103 over links 131. The radio circuitry exchanges the user data with the BBU circuitry in wireless access node 111. The BBU circuitry in wireless access node 111 exchanges the user data with data element 122 over backhaul link 142. Data element 122 exchanges the user data with other systems over data link 146.

Advantageously, wireless communication network 100 efficiently and effectively uses IAB to fix network faults at wireless access node 111.

In some examples, wireless access node 111 comprises an IAB Mobile Terminal (MT). The IAB MT is similar to UEs 101-106 but the IAB MT is adapted to serve IAB link 133 to wireless access node 111. In these examples, the BBU circuitry in wireless access node 111 directs the IAB MT to scan for the wireless IAB service in response to the fault. The IAB MT processes a stored list of IAB frequencies to scan the frequencies and detect an IAB broadcast from neighbor access node 112 at one of the IAB frequencies. The IAB MT attaches to the wireless IAB service responsive to the IAB broadcast. The BBU circuitry in wireless access node then exchanges fault data with network controller 123 over the IAB MT, IAB link 133, neighbor access node 112, backhaul link 143/144, element 121/122, and network link 148/149.

In other examples, the radio circuitry in wireless access node 111 that serves UEs 101-103 over wireless links 131 also handles IAB link 133. The radio circuitry scans for the wireless IAB service in response to BBU instructions for the fault. The radio circuitry attaches to the wireless IAB service responsive to the IAB broadcast. The BBU circuitry in wireless access node 111 then exchanges fault data with network controller 123 over the radio circuitry, IAB link 133, neighbor access node 112, backhaul link 143/144, element 121/122, and network link 148/149.

Figure 2:
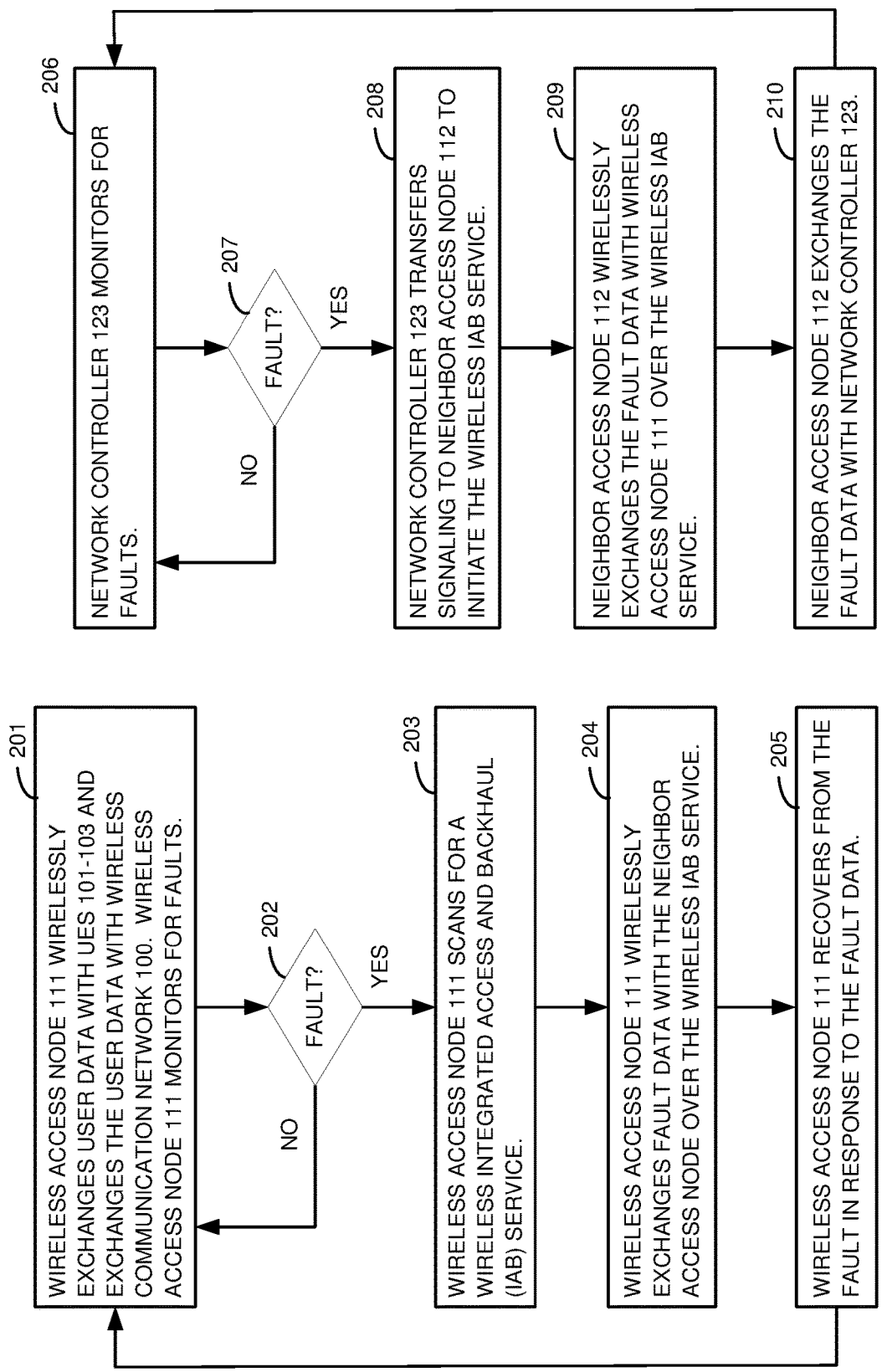
FIG. 2 illustrates the operation of the wireless communication network to use IAB to recover from wireless access node faults.

FIG. 2 illustrates the operation of wireless communication system 100 to use IAB to recover from wireless access node faults. Wireless access node 111 wirelessly exchanges user data with UEs 101-103 and exchanges the user data with wireless communication network 100 (201). Wireless access node 111 monitors for faults (201). When wireless access node 111 detects a fault (202), wireless access node 111 scans for a wireless IAB service (203). Wireless access node 111 wirelessly exchanges fault data with neighbor access node 112 over IAB link 133 (204). Wireless access node 111 recovers from the fault in response to the fault data (205). After fault recovery, the operation in wireless access node 111 repeats (201).

Contemporaneously with operations 201-205, network controller 123 monitors for faults (206). When network controller 123 detects the fault (207), network controller 123 transfers network signaling to neighbor access node 112 to initiate the wireless IAB service (208). Neighbor access node 112 wirelessly exchanges the fault data with wireless access node 111 over IAB link 133 (209). Neighbor access node 112 exchanges the fault data with network controller (210). The contemporaneous operation then repeats (206).

Figure 3:
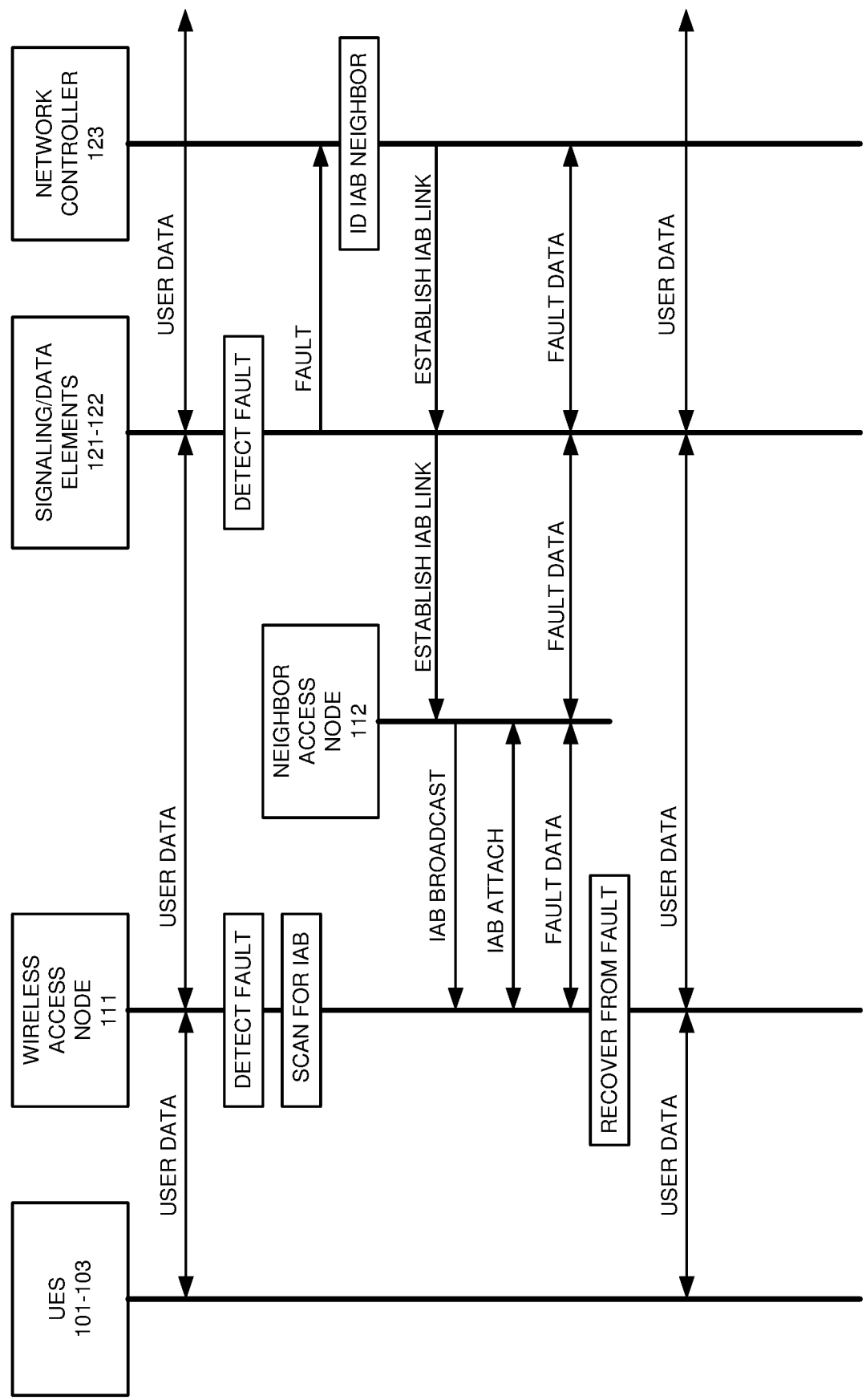
FIG. 3 illustrates the operation of the wireless communication network to use IAB to recover from wireless access node faults.

FIG. 3 illustrates the operation of the wireless communication system 100 to use IAB to recover from wireless access node faults. UEs 101-103 and wireless access node 111 wirelessly exchange user data. Wireless access node 111 exchanges the user data with data element 122. Data element 122 exchanges the user data with other systems. Wireless access node 111 detects a fault and responsively scans for wireless IAB service.

Signaling element 121 or data element 122 also detect the fault and responsively transfer fault information to network controller 123. Network controller 123 selects neighbor access node 112 to help with fault recovery based on the fault information. Network controller 123 transfers network signaling to establish the IAB link to signaling element 121. Signaling element 121 transfers network signaling to establish the IAB link to neighbor access node 112. In response to the network signaling, neighbor access node 112 wirelessly transmits an IAB broadcast to identify its IAB service—typically on a short and periodic basis. Wireless access node 111 scans and receives the IAB broadcast. In response to receiving the IAB broadcast, wireless access node 111 and neighbor access node 112 exchange IAB attachment signaling to establish wireless IAB link 133.

Wireless access node 111 and network controller 123 exchange fault data over IAB link 133 served by neighbor access node 112. Wireless access node 111 recovers from the fault in response to the fault data. After the fault recovery, UEs 101-103 wirelessly exchange user data with wireless access node 111. Wireless access node 111 exchanges the user data with data element 122. Data element 122 exchanges the user data with other systems.

Figure 4:
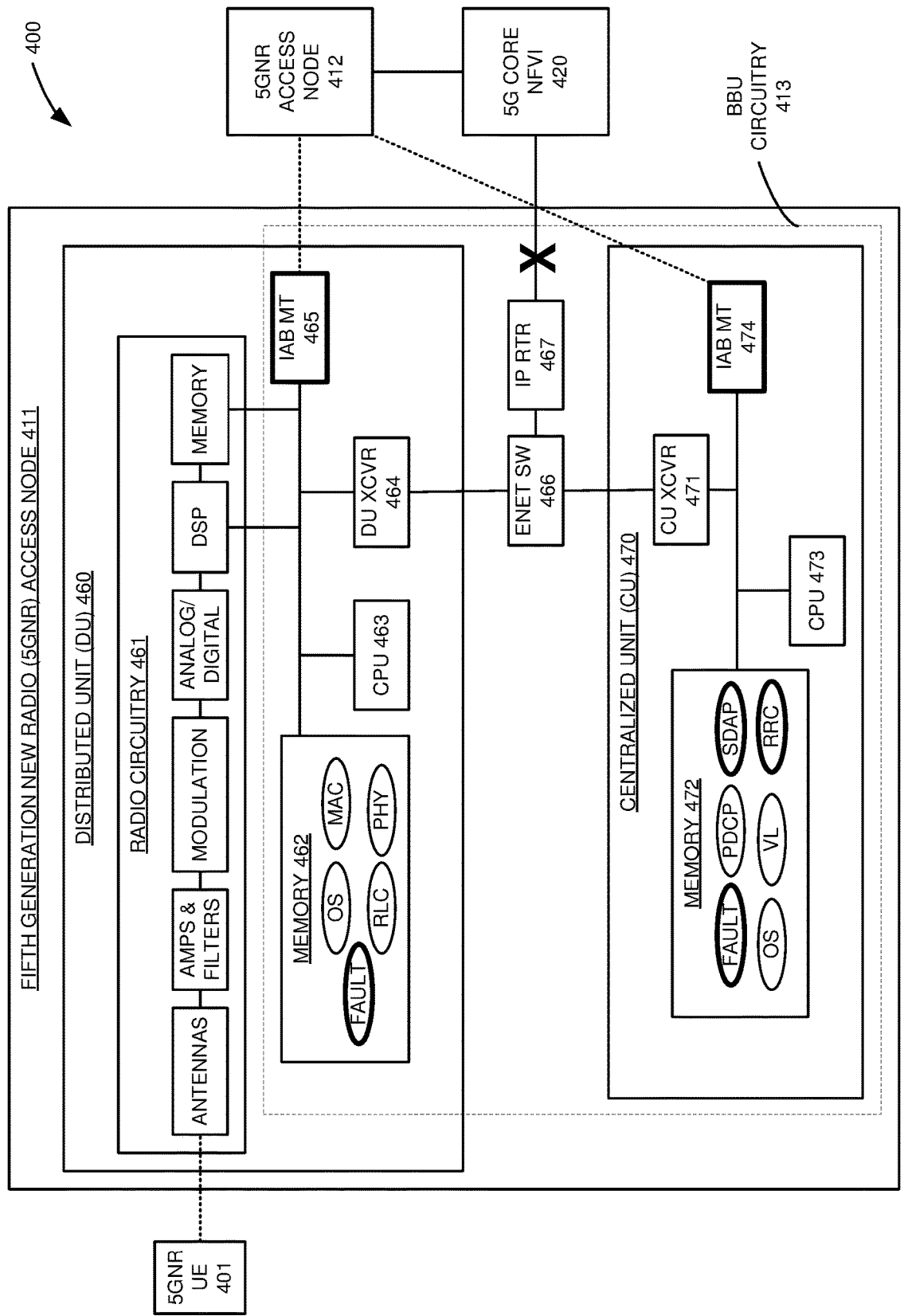
FIG. 4 illustrates a Fifth Generation New Radio (5GNR) access node in a Fifth Generation (5G) wireless network that uses IAB to recover from 5GNR access node faults.

FIG. 4 illustrates Fifth Generation New Radio (5GNR) access node 411 in Fifth Generation (5G) wireless network 400 that uses IAB to recover from 5GNR access node faults. 5G network 400 is an example of wireless communication network 100, although network 100 may differ. 5G network 400 comprises UE 401, 5GNR access nodes 411-412, and 5G core Network Function Virtualization Infrastructure (NFVI) 420. 5GNR access node 411 is an example of access nodes 111-112, although access nodes 111-112 may differ.

5GNR access node 411 comprises Distributed Unit (DU) 460, ethernet switch (ENET SW) 466, Internet Protocol router (IP RTR) 467, and Centralized Unit (CU) 470. DU 460 comprises radio circuitry 461, memory 462, CPU 463, DU XCVR 464, and IAB Mobile Terminal (MT) 465 that are coupled over bus circuitry. XCVR refers to transceiver. Radio circuitry 461 comprises antennas, amplifiers (AMPS), filters, modulation, analog-to-digital interfaces, DSP, and memory that are coupled over bus circuitry. CU 470 comprises CU XCVR 471, memory 472, CPU 473, and IAB MT 474 that are coupled over bus circuitry.

5GNR access node 411 comprises radio circuitry 461 and BBU circuitry 413. BBU circuitry 413 comprises CU 470, Ethernet switch 466, IP router 467, and a portion of DU 460 (memory 462, CPU 463, DU XCVR 464, IAB MT 465, and associated bus circuitry). UE 401 is wirelessly coupled to the antennas in DU 460. DU XCVR 464 is coupled to ethernet switch 466. Ethernet switch 466 is coupled to IP router 467 and CU XCVR 471. IP router 467 is coupled to 5G core NFVI 420. IAB MTs 465 and 474 can be wirelessly linked to 5GNR access node 412 using IAB.

In DU 460, memory 462 stores operating system (OS), Physical Layer (PHY), Media Access Control (MAC), Radio Link Control (RLC), and fault recovery application (FAULT). In CU 470, memory 472 stores an operating system, virtual layer (VL), Packet Data Convergence Protocol (PDCP), Radio Resource Control (RRC), Service Data Adaptation Protocol (SDAP), and fault recovery application. The virtual layer comprises hypervisor modules, virtual switches, virtual CPUs, and/or the like. CPU 473 in CU 470 executes the PDCP, RRC, and SDAP to drive the exchange of user data and network signaling between 5G core NFVI 420 and DU 460—including fault detection. CPU 463 in DU 460 executes the PHY, MAC, and RLC to drive the transfer of user data and network signaling between CU 470 and UE 401—including fault detection. The functionality split of the network applications (PHY, MAC, RLC, PDCP, RRC, SDAP) between DU 460 and CU 470 may vary.

In radio circuitry 461 of DU 460, the antennas receive wireless 5GNR signals from 5GNR UE 401 that transport the Uplink (UL) signaling and data. The antennas transfer corresponding electrical UL signals through duplexers to the amplifiers. The amplifiers boost the received UL signals for filters which attenuate unwanted energy. In modulation, demodulators down-convert the UL signals from their carrier frequency. The analog/digital interfaces convert the analog UL signals into digital UL signals for the DSP. The DSP recovers UL 5GNR symbols from the UL digital signals. In DU 460 and CU 470, CPU 463 and CPU 473 execute the network applications to process the UL 5GNR symbols and recover the UL signaling and data. In CU 470, CPU 473 executes the RRC to generate corresponding UL N2 signaling and UL N3 data. CU 470 transfers the UL N2 signaling to Access and Mobility Management Functions (AMFs) in 5G core NFVI 420 over ethernet switch 466 and IP router 467. CU 470 transfers the UL N3 data to User Plane Functions (UPFs) in 5G core NFVI 420 over ethernet switch 466 and IP router 467.

In CU 470, CU XCVR 471 receives Downlink (DL) N2 signaling from the AMFs and DL N3 data from the UPFs in 5G core NFVI 420 over ethernet switch 466 and IP router 467. In CU 470 and DU 460, CPU 473 and 463 execute the network applications to generate corresponding DL signaling and data. In CU 470 and DU 460, CPU 473 and CPU 463 execute the network applications to process the DL signaling and data to generate DL 5GNR symbols that carry the DL signaling and data. In DU 460, the DSP processes the DL 5GNR symbols to generate corresponding digital signals for the analog-to-digital interfaces. The analog-to-digital interfaces convert the digital DL signals into analog DL signals for modulation. Modulation up-converts the DL signals to their carrier frequency. The amplifiers boost the modulated DL signals for the filters which attenuate unwanted out-of-band energy. The filters transfer the filtered DL signals through duplexers to the antennas. The electrical DL signals drive the antennas to emit corresponding wireless 5GNR signals that transport the DL signaling and data to 5GNR UE 401.

RRC functions comprise authentication, security, handover control, status reporting, Quality-of-Service (QoS), network broadcasts and pages, and network selection. SDAP functions comprise QoS marking and flow control. PDCP functions comprise LTE/5GNR allocations, security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid Automatic Repeat Request (HARM), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, rate matching/de-matching, scrambling/descrambling, modulation mapping/de-mapping, channel estimation/equalization, Fast Fourier Transforms (FFTs)/Inverse FFTs (IFFTs), channel coding/decoding, layer mapping/de-mapping, precoding, Discrete Fourier Transforms (DFTs)/Inverse DFTs (IDFTs), and Resource Element (RE) mapping/de-mapping.

A fault occurs in 5GNR access node 411. For example, ethernet switch 466 or IP router 467 may fail. The RRC and/or SDAP in CU 470 detect the fault by sensing the loss of N2 signaling or N3 data and notifying the fault recovery application in CU 470 or DU 460. In response to the fault, the fault recovery application in CU 470 and/or CU 460 directs IAB MT 474 and/or IAB MT 465 to scan for wireless IAB service. IAB MT 474 and/or 465 host a list of IAB frequencies to scan and eventually detect an IAB broadcast. In response to detecting the IAB broadcast, IAB MT 465 and/or IAB MT 474 wirelessly exchange IAB attachment signaling with 5GNR access node 512 and establish a wireless IAB link.

The fault recovery application and a network controller in 5G core NFVI 420 exchange fault data to perform fault recovery. The exchange of the fault data occurs over the wireless IAB link. The fault recovery application recovers from the fault in response to the fault data exchange with 5G core NFVI 420. The fault recovery application may reboot ethernet switch 466, IP router 467, radio circuitry 461, or their respective software components. After fault recovery, CPU 473 in CU 470 executes the PDCP, RRC, and SDAP to drive the exchange of user data and network signaling between 5G core NFVI 420 and DU 460—including fault detection. CPU 463 in DU 460 executes the PHY, MAC, and RLC to drive the transfer of user data and network signaling between CU 470 and UE 401—including fault detection.

Figure 5:
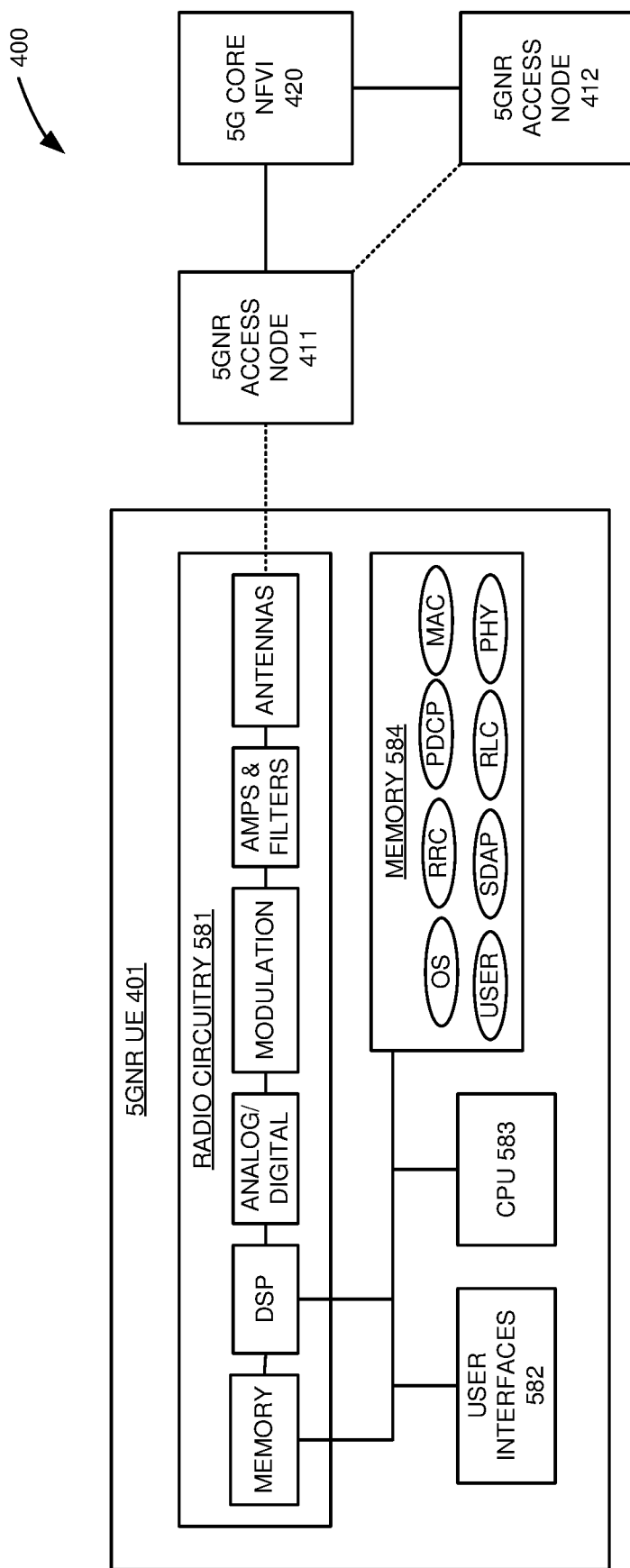
FIG. 5 illustrates a 5GNR User Equipment (UE) in the 5G wireless network.

FIG. 5 illustrates 5GNR UE 401 in 5G wireless network 400. 5GNR UE 401 is an example of UEs 101-106, although UEs 101-106 may differ. 5GNR UE 401 is similar to MTs 465 and 474. UE 401 comprises radio circuitry 581, user interfaces 582, CPU 583, and memory 484 which are interconnected over bus circuitry. Radio circuitry 581 comprises antennas, amplifiers, filters, modulation, analog-to-digital interfaces, DSP, and memory that are coupled over bus circuitry. The antennas in 5GNR UE 401 are coupled to 5GNR access node 411. User interfaces 582 comprise graphic displays, machine controllers, sensors, cameras, transceivers, and/or some other user components. Memory 584 stores an operating system, user applications, and network applications. The network applications comprise PHY, MAC, RLC, PDCP, RRC and SDAP. CPU 583 executes the operating system, user applications, and network applications to exchange 5GNR signaling and data with 5GNR access node 411 over radio circuitry 581.

Figure 6:
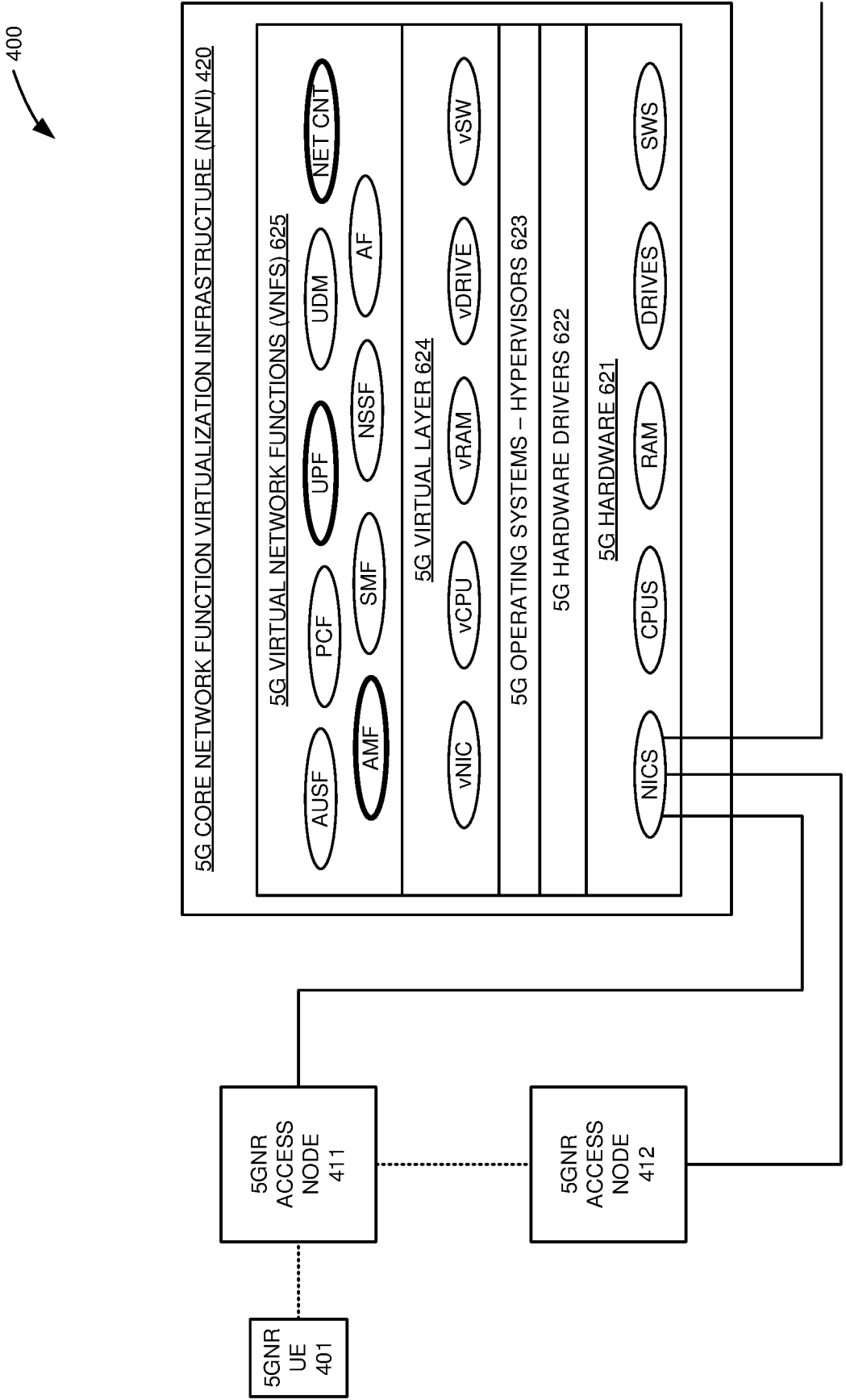
FIG. 6 illustrates a 5G Core NFVI in the 5G wireless network.

FIG. 6 illustrates 5G Core NFVI 420 in 5G wireless network 400, where NFVI refers to Network Function Virtualization Infrastructure. 5G core NFVI 420 is an example of signaling element 121, data element 122, and network controller 123, although elements 121-122 and controller 123 may differ. 5G core NFVI 420 comprises 5G hardware 621, 5G hardware drivers 622, 5G operating systems and hypervisors 623, 5G virtual layer 624, and 5G Virtual Network Functions (VNFs) 625. 5G hardware 621 comprises Network Interface Cards (NICs), CPUs, RAM, flash/disk drives, and data switches (SWS). 5G virtual layer 624 comprises virtual NICs (vNIC), virtual CPUs (vCPU), virtual RAM (vRAM), virtual Drives (vDRIVE), and virtual Switches (vSW). The NICs are coupled to 5GNR access nodes 411-412 and external systems over data links. 5G VNFs 625 comprise Authentication and Security Functions (AUSF), Policy Control Functions (PCF), Access and Mobility Management Functions (AMF), Session Management Functions (SMF), User Plane Functions (UPF), Unified Data Management (UDM), Network Slice Selection Functions (NSSF), Application Functions (AF), and Network Controller Functions (NET CNT). Other 5G network functions are typically present but are omitted for clarity. 5G hardware 621 executes 5G hardware drivers 622, 5G operating systems and hypervisors 623, 5G virtual layer 624, and 5G VNFs 625 to serve the 5GNR UE 401 with data services.

The UPF and AMF detect faults by sensing a loss of communication with 5GNR access node 411. The UPF and AMF notify the NET CNT of the fault for 5GNR access node 411. The NET CNT selects 5GNR access node 412 (and possibly other access nodes) to start IAB service to fix the fault based on proximity and status. The NET CNT signals 5GNR access node 412 over the AMF or UPF to start IAB service for 5GNR access node 411 with a link back to the NET CNT. The NET CNT exchanges fault data with 5GNR access node 411. The fault data from wireless access node 411 characterizes the failing system like a crashed ethernet switch, unresponsive IP router, or noisy radio. The NET CNT identifies recovery actions or scripts based on the fault characterization. The recovery actions or scripts may comprise instructions to reboot hardware components by removing their power supply or rebooting software components by reinstalling them from memory. The fault data sent to 5GNR access node 411 indicates the recovery actions or scripts.

Figure 7:
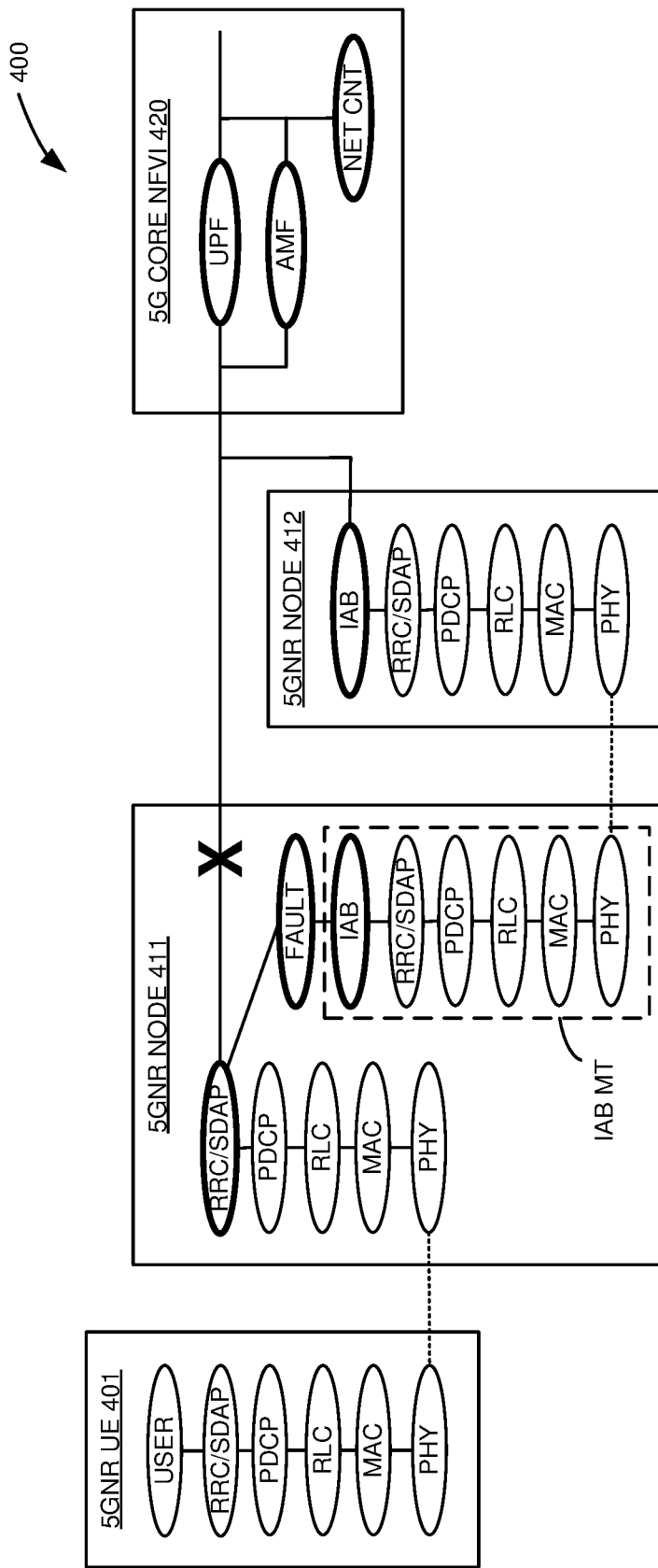
FIG. 7 illustrates the operation of the 5G wireless network to use IAB to recover from 5GNR access node faults.

FIG. 7 illustrates the operation of 5G wireless network 400 to use IAB to recover from 5GNR access node faults. In 5GNR UE 401, the user application exchanges user data and signaling with the RRC/SDAP. The RRC/SDAP in UE 401 exchanges corresponding network signaling with the RRC/SDAP in 5GNR access node 411 over their PDCPs, RLCs, MACs, and PHYs. The RRC exchanges N2 signaling with the AMF. The SDAP exchanges N3 data with the UPF.

A fault occurs in 5GNR access node 411. The RRC/SDAP detect the fault by sensing the loss of N2 signaling or N3 data. The RRC/SDAP notify the fault recovery application. In response, the fault recovery application directs an IAB MT (IAB) to establish an IAB link. The IAB MT configures its RRC, SDAP, PDCP, RLC, MAC, and PHY to handle IAB attachment and IAB links.

In 5G core NFVI 420, the UPF detects the fault by sensing a loss of N3 data from 5GNR access node 411. The AMF detects the fault by sensing a loss of N2 signaling from 5GNR access node 411. The UPF and AMF notify the NET CNT of the fault for 5GNR access node 411. The NET CNT selects 5GNR access node 412 (and possibly other access nodes) to start IAB service based on proximity and status. The NET CNT signals an IAB controller (IAB) in 5GNR access node 412 over the AMF or UPF to start IAB service for 5GNR access node 411 with a link back to the NET CNT.

The IAB controller in 5GNR access node 412 starts to broadcast IAB information over the RRC, PDCP, RLC, MAC, and PHY. The IAB controller in 5GNR access node 412 configures the RRC, SDAP, PDCP, RLC, MAC, and PHY to handle IAB attachment and IAB links over a portion of its wireless spectrum. The IAB broadcast and configuration may cycle on and off, have a short on cycle, and use a narrow amount of bandwidth.

One of IAB MTs 466 and 474 in 5GNR node 411 detects the IAB broadcast from 5GNR access node 412 over its RRC, PDCP, RLC, MAC, and PHY. The detecting IAB MT in 5GNR node 411 exchanges IAB attachment signaling with the IAB controller in 5GNR node 412 over their RRCs, PDCPs, RLCs, MACs, and PHYs. The IAB MT in 5GNR node 411 and the IAB controller in 5GNR node 412 establish a wireless IAB link over their RRCs, SDAPs, PDCPs, RLCs, MACs, and PHYs. The IAB controller in 5GNR node 412 couples the IAB link to the NET CNT in 5G core NFVI 420 over the UPF or AMF.

The fault recovery application in 5GNR node 411 and the NET CNT in 5G core NFVI 420 exchange fault data to perform fault recovery. The exchange of the fault data occurs over the IAB MT, the wireless IAB link, and 5GNR node 412. The fault recovery application recovers from the fault in response to the fault data exchange with the NET CNT in 5G core NFVI 420. After fault recovery, 5GNR access node 411 wirelessly exchanges user data and signaling with 5GNR UE 401 and also exchanges N2 signaling and N3 data with the AMF and UPF in 5G core NFVI 420.

Figure 8:
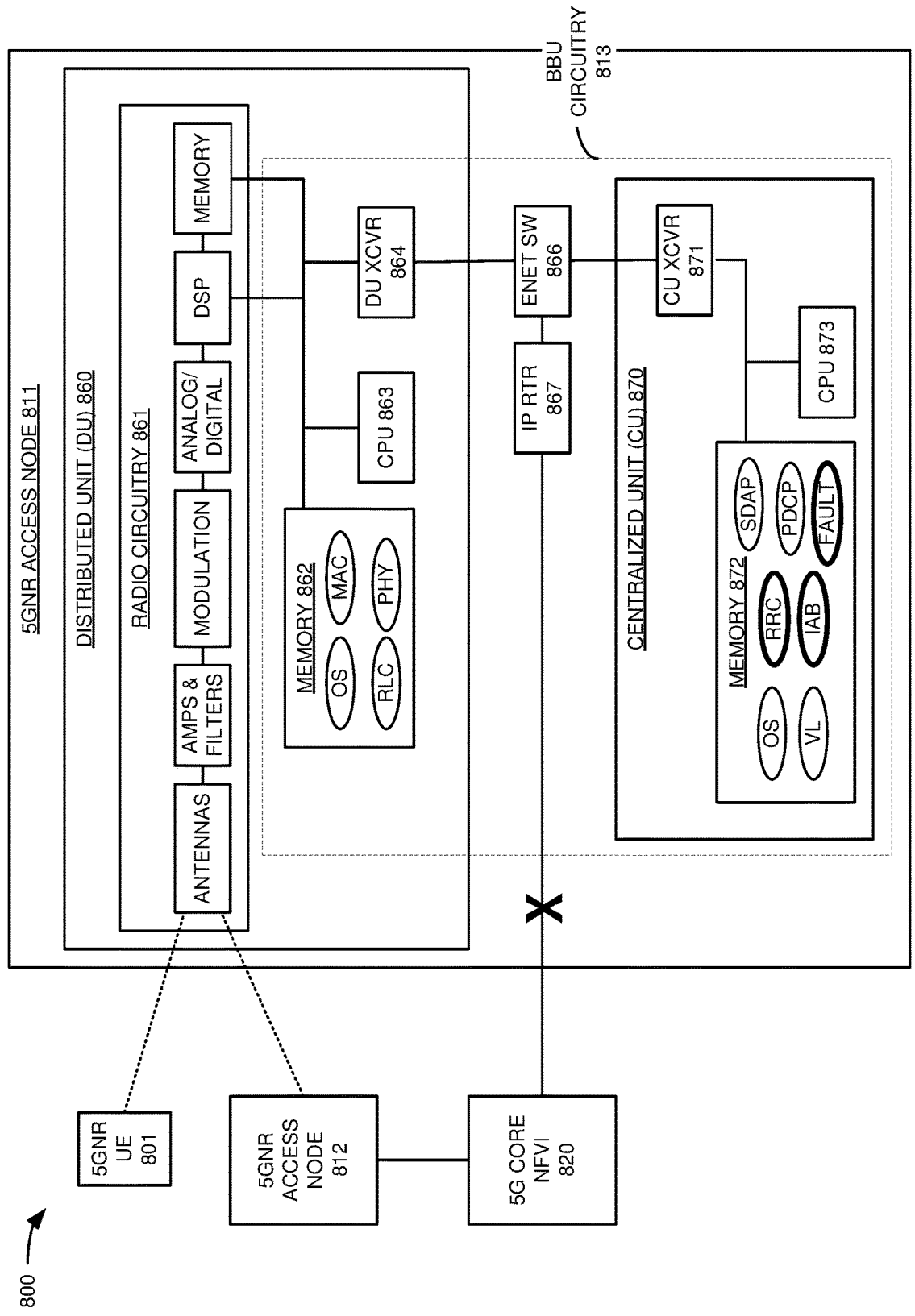
FIG. 8 illustrates another 5GNR access node in another 5G wireless network that uses IAB to recover from 5GNR access node faults.

FIG. 8 illustrates 5GNR access node 811 in 5G wireless network 800 that uses IAB to recover from 5GNR access node faults. 5G network 800 is an example of wireless communication network 100, although network 100 may differ. 5G network 800 comprises UE 801, 5GNR access nodes 811-812, and 5G core NFVI 820. 5GNR access node 811 is an example of access nodes 111-112, although access nodes 111-112 may differ. 5GNR access node 811 comprises Distributed Unit (DU) 860, ethernet switch 865, IP router 866, and Centralized Unit (CU) 870. DU 860 comprises radio circuitry 861, memory 862, CPU 863, and DU XCVR 864 that are coupled over bus circuitry. Radio circuitry 861 comprises antennas, amplifiers, filters, modulation, analog-to-digital interfaces, DSP, and memory that are coupled over bus circuitry. CU 870 comprises CU XCVR 871, memory 872, and CPU 873 that are coupled over bus circuitry. In 5GNR access node 811, BBU circuitry 813 comprises CU 870, Ethernet switch 866, IP router 867, and a portion of DU 860 (memory 862, CPU 863, DU XCVR 864, and associated bus circuitry).

5GNR communication network 800 and 5GNR access node 811 operate like 5GNR communication network 400 and 5GNR access node 411 except that 5GNR access node 811 uses radio circuitry 861 for wireless IAB service instead of an IAB MT. In DU 860, memory 462 stores operating system, PHY, MAC, and RLC. In CU 870, memory 872 stores an operating system, virtual layer, PDCP, RRC, SDAP, fault recovery application, and IAB controller. When a fault occurs in 5GNR access node 811, the fault recovery application directs the IAB controller to use a portion of radio circuitry 861 for wireless IAB service. The IAB controller may host a list of IAB frequencies to scan and detect an IAB broadcast. In response to detecting an IAB broadcast, the IAB controller wirelessly exchanges IAB attachment signaling with 5GNR access node 812 over radio circuitry 861 and establishes a wireless IAB link with 5GNR access node 812 over radio circuitry 861.

Figure 9:
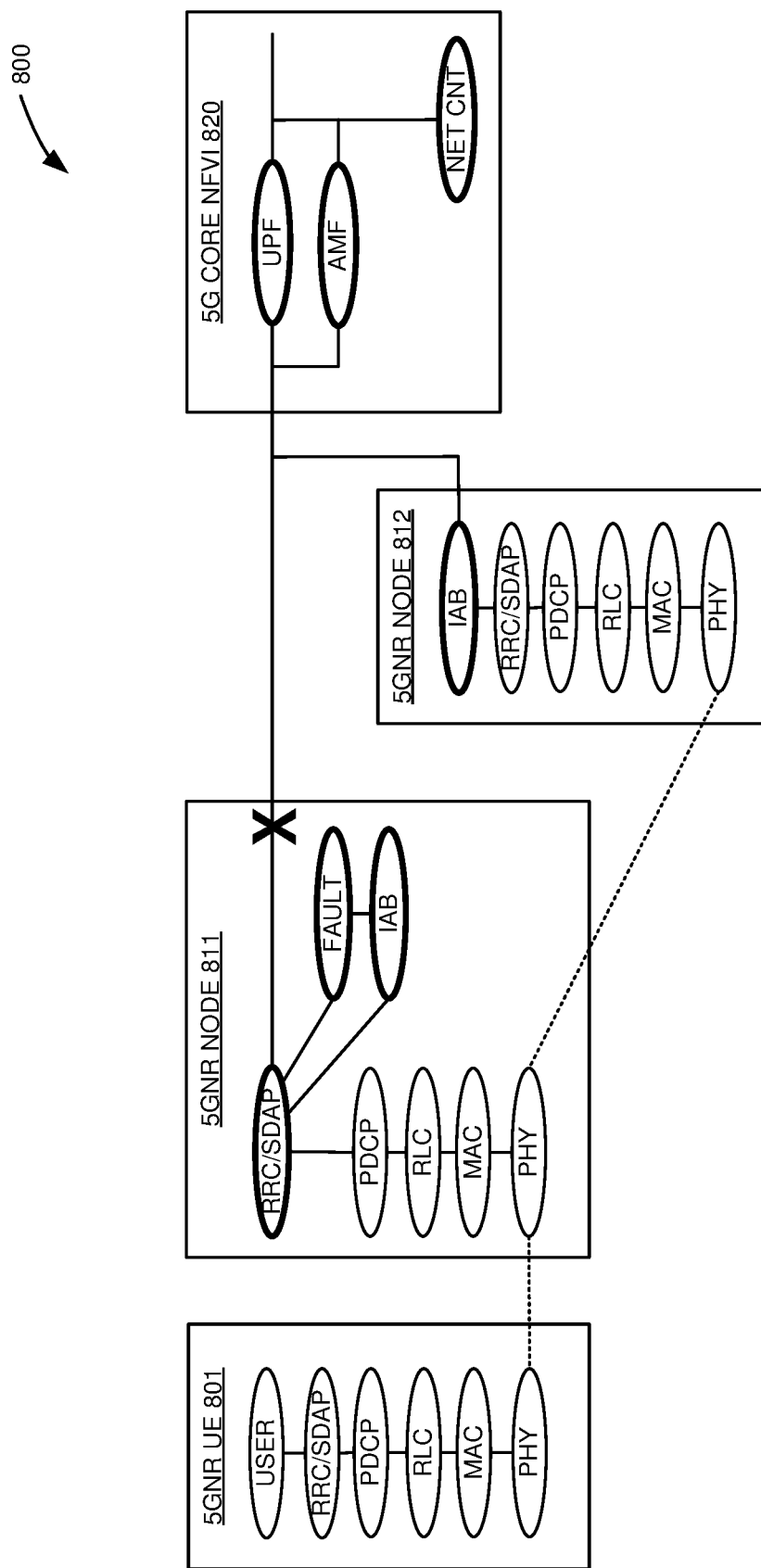
FIG. 9 illustrates the operation of the other 5G wireless network to use IAB to recover from 5GNR access node faults.

FIG. 9 illustrates the operation of 5G wireless network 800 to use IAB to recover from 5GNR access node faults. When the fault occurs in 5GNR access node 411, the fault recovery application directs the IAB controller to establish an IAB link. The IAB controller configures the RRC, SDAP, PDCP, RLC, MAC, and PHY in CU 870 and DU 860 to handle IAB attachment and IAB links. The IAB controller in 5GNR node 811 detects the IAB broadcast from 5GNR access node 812 over radio circuitry 861 and the RRC, PDCP, RLC, MAC, and PHY. The IAB controller in 5GNR node 811 exchanges IAB attachment signaling with the IAB controller in 5GNR node 812 over their RRCs, PDCPs, RLCs, MACs, and PHYs. The IAB controller in 5GNR node 811 and the IAB controller in 5GNR node 812 establish a wireless IAB link over their RRCs, SDAPs, PDCPs, RLCs, MACs, and PHYs. The IAB controller in 5GNR node 812 couples the IAB link to the NET CNT in 5G core NFVI 420 over the UPF or AMF. The NET CNT and the fault recovery application use the IAB link to exchange fault data and recover from the fault.

The wireless data network circuitry described above comprises computer hardware and software that form special-purpose network circuitry to recover from wireless access node faults using IAB. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to recover from wireless access node faults using IAB.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless access node to recover from a fault, the method comprising:
   a radio wirelessly exchanging user data with wireless user devices;
   a baseband unit (BBU) exchanging the user data with a wireless communication network;
   the BBU detecting the fault and responsively directing an Integrated Access and Backhaul (IAB) Mobile Terminal (MT) to scan for a wireless IAB service;
   the IAB MT scanning for the wireless IAB service;
   the BBU exchanging fault data with the IAB MT;
   the IAB MT wirelessly exchanging the fault data with a neighbor access node over the wireless IAB service;
   the BBU recovering from the fault in response to the fault data;
   the radio wirelessly exchanging additional user data with wireless user devices; and
   the BBU exchanging the additional user data with the wireless communication network.

2. The method of claim 1 wherein the BBU directing the IAB MT to scan for the wireless IAB service comprises a Radio Resource Control (RRC) indicating the fault to a fault recovery application and the fault recovery application signaling the IAB MT to establish an IAB link for the wireless IAB service.

3. The method of claim 1 wherein the IAB MT scanning for the wireless IAB service comprises the IAB MT processing a list of IAB frequencies and responsively detecting an IAB broadcast for the wireless IAB service from the neighbor access node at one of the IAB frequencies.

4. The method of claim 1 wherein the IAB MT wirelessly exchanging the fault data with the neighbor access node over the wireless IAB service comprises exchanging Fifth Generation New Radio (5GNR) signals with the neighbor access node.

5. The method of claim 1 wherein the IAB MT is in a Fifth Generation New Radio (5GNR) Distributed Unit (DU).

6. The method of claim 1 wherein the IAB MT is in a Fifth Generation New Radio (5GNR) Centralized Unit (CU).

7. The method of claim 1 wherein the IAB MT is in a Fifth Generation New Radio (5GNR) Distributed Unit (DU) and the BBU is in a 5GNR Centralized Unit (CU).

8. The method of claim 1 wherein the IAB MT is in a Fifth Generation New Radio (5GNR) Distributed Unit (DU) and the BBU is in the 5GNR DU.

9. The method of claim 1 wherein the BBU recovering from the fault comprises rebooting an Internet Protocol (IP) router responsive to the signaling.

10. The method of claim 1 wherein the BBU recovering from the fault comprises rebooting an ethernet switch responsive to the signaling.

11. A wireless access node to recover from a fault, the wireless access node comprising:
    a radio wirelessly configured to exchange user data with wireless user devices;
    a baseband unit (BBU) configured to exchange the user data with a wireless communication network;
    the BBU configured to detect the fault and responsively direct an Integrated Access and Backhaul (IAB) Mobile Terminal (MT) to scan for a wireless IAB service;
    the IAB MT configured to scan for the wireless IAB service;
    the BBU configured to exchange fault data with the IAB MT;
    the IAB MT configured to wirelessly exchange the fault data with a neighbor access node over the wireless IAB service;
    the BBU configured to recover from the fault in response to the fault data;
    the radio configured to wirelessly exchange additional user data with wireless user devices; and
    the BBU configured to exchange the additional user data with the wireless communication network.

12. The wireless access node of claim 11 wherein the BBU comprises a Radio Resource Control (RRC) configured to indicate the fault to a fault recovery application and the fault recovery application configured to signal the IAB MT to establish an IAB link for the wireless IAB service.

13. The wireless access node of claim 11 wherein the IAB MT is configured to process a list of IAB frequencies and responsively detect an IAB broadcast for the wireless IAB service from the neighbor access node at one of the IAB frequencies.

14. The wireless access node of claim 11 wherein the IAB MT is configured to exchange Fifth Generation New Radio (5GNR) signals with the neighbor access node.

15. The wireless access node of claim 11 wherein the IAB MT is in a Fifth Generation New Radio (5GNR) Distributed Unit (DU).

16. The wireless access node of claim 11 wherein the IAB MT is in a Fifth Generation New Radio (5GNR) Centralized Unit (CU).

17. The wireless access node of claim 11 wherein the IAB MT is in a Fifth Generation New Radio (5GNR) Distributed Unit (DU) and the BBU is in a 5GNR Centralized Unit (CU).

18. The wireless access node of claim 11 wherein the IAB MT is in a Fifth Generation New Radio (5GNR) Distributed Unit (DU) and the BBU is in the 5GNR DU.

19. The wireless access node of claim 11 wherein the BBU is configured to recover from the fault by rebooting an Internet Protocol (IP) router responsive to the signaling.

20. The wireless access node of claim 11 wherein the BBU is configured to recover from the fault by rebooting an ethernet switch responsive to the signaling.

* * * * *